INVENTORS.
Carl M. Wenrich and
Arthur H. Phillips

BY their ATTORNEY

Nov. 3, 1964     C. M. WENRICH ETAL     3,155,875
HIGH FREQUENCY BALLAST FOR FLUORESCENT LAMPS
Filed Oct. 5, 1961     2 Sheets-Sheet 2

INVENTORS
Carl M. Wenrich and
Arthur H. Phillips
BY *William J. Ruano*
their ATTORNEY

3,155,875
HIGH FREQUENCY BALLAST FOR FLUORESCENT LAMPS

Carl M. Wenrich, Temple, and Arthur H. Phillips, Reading, Pa., assignors to Gilbert Associates, Inc., Reading, Pa.
Filed Oct. 5, 1961, Ser. No. 143,131
1 Claim. (Cl. 315—189)

This invention relates to a high frequency ballast for fluorescent lamps and, more particularly, to inverters used as high frequency square wave generators for operating fluorescent lamps. This invention is an improvement over Patent No. 2,923,856 issued to D. L. Greene and A. H. Phillips February 2, 1960, entitled High Frequency Ballast Unit, owned by the present assignee.

An outstanding disadvantage of high frequency ballasts presently used for fluorescent lamps, such as those including conventional push-pull type inverters, is that they operate at relatively lower voltages and higher currents, as compared to the inverter embodied in the present invention, therefore have higher losses and lower efficiency, as well as requiring larger units, which involve greater expense.

An object of the present invention is to provide a novel high frequency ballast for fluorescent lamps which is devoid of the above named disadvantages and which will enable application of a higher voltage to the inverter, and wherein lower current, at a higher voltage is required both from the rectifiers and through the transistors and other components, therefore provides lower power or $I^2R$ losses and simplifies the problem of filtering and increases the efficiency of the output transformer.

Other objects and advantages will become more apparent from a study of the following description taken with the accompanying drawings wherein:

FIG. 2 shows a modified inverter circuit portion for energizing the lamp circuit portion shown in FIG. 2a;

Figure 1:
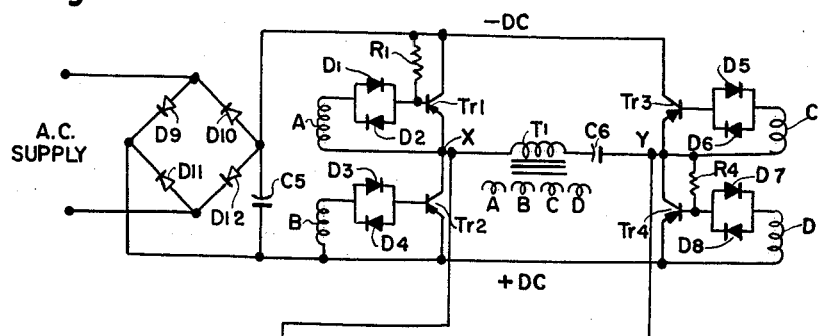
FIG. 1 shows the inverter circuit portion and FIG. 1a shows the lamp circuit portion of the high frequency ballast circuit embodying the present invention.
Figure 1A:
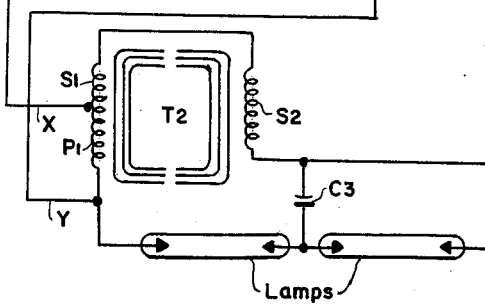

Referring more particularly to FIG. 1 of the drawing, there is shown an inverter circuit embodying four semiconductors or transistors $Tr1$, $Tr2$, $Tr3$, and $Tr4$, disposed in pairs, each pair being connected in series across a source of direct current supply, denoted as $+D.C.$ and $-D.C.$ Preferably, the transistors employed are of the junction type, although point-contact transistors may also be suitable. A junction type resistor includes a body of semiconducting material such as silicon or germanium having prescribed impurities to provide three distinct regions with rectifying junctions between regions of opposite conductivity types. The transistors may be assumed to be of the p-n-p type, although n-p-n transistors may be used instead. Suitable contacts at the terminal p regions provide emitter and collector electrodes. A large area, low resistance contact is made to the semi-conducting body to provide the base electrode. By applying suitable electrical potentials between the various electrodes, current flow between the emitter and collector electrodes may be controlled.

The present invention is not restricted to the use of any particular type of transistor.

The four transistors $Tr1$, $Tr2$, $Tr3$ and $Tr4$, respectively, in effect form a switch which is used to connect primary windings of transformers T1 and T2 to the D.C. supply. All four transistors are normally conducting very small currents and so, for practical purposes, are open switches. The bases, or controlling elements, of transistors $Tr1$ and $Tr4$ are inductively coupled to the primary of transformer T1 through secondaries A and D. These two secondaries are in phase with each other. The bases, or controlling elements of transistors $Tr2$ and $Tr3$ are coupled to the primary of transformer T1 through secondaries B and C which are in phase with each other but are out of phase with secondaries A and D.

FIG. 1 shows two diodes, $D_1$–$D_2$ and $D_3$–$D_4$, in each base circuit so arranged to conduct in both directions. The purpose of the diodes is to provide a small, constant bias on all transistors so that the inverter will start dependably. The resistors R1, R4 from base to collector of transistors $Tr1$ and $Tr4$ bias those two transistors a little heavier so as to further assure dependable starting.

T1 is a small transformer which enables it to be conveniently designed so that the core on which the coils are wound can be easily saturated by magnetic flux produced by current flowing in the primary coil. T1 serves as a driver transformer. When a transformer core saturates, the energy transferred from the primary winding to the secondary winding ceases in the following manner. Current in the primary coil produces magnetic flux in the core. Changing current in the primary coil produces a corresponding change in the flux produced in the core. This flux is more or less directly proportional to the current producing it so long as the core has the ability to carry the flux produced. When a change in the primary current produces little or no change in the flux produced, the core is saturated. Energy is transferred in a transformer when the flux, produced by the primary coil current, passes through the secondary coils, causing a current to flow in the secondary coil. The speed at which the flux passes through the secondary coil and the amount of flux passing through the secondary coil and the number of secondary turns all determine the energy which can be obtained from the secondary coil. When the core becomes saturated, the amount of flux is limited so energy transferred is simultaneously limited.

In operation, the alternate pairs of transistors, ($Tr1$ and $Tr4$ being one pair, and $Tr2$ and $Tr3$ being the other pair) are switched on and off by the action of the driver transformer T1 in the following manner.

All four transistors are approximately cut off or non-conducting. There is, however, a small current flowing. There is, also, a larger current flowing in one pair than in another. Assume that transistors $Tr1$ and $Tr4$ are conducting more current than transistors $Tr2$ and $Tr3$. In this case, current would pass through transformer T1 from Y to X. A current would then be induced in secondaries A, B, C and D so that transistors $Tr1$ and $Tr4$ would be driven toward maximum conduction, and transistors $Tr2$ and $Tr3$ would be driven toward cut-off. This is a regenerative process, because the more current which passes through transistors $Tr1$ and $Tr4$, the harder their inputs are driven so as to draw still more current from the D.C. supply. This process continues until transformer T1 saturates at which time the secondaries no longer drive the bases. The current through transformer T1 and transistors $Tr1$ and $Tr4$ no longer increases so the current from transformer T1 to transistors $Tr1$ and $Tr4$ decreases. As soon as this happens, the regenerative effect drives transistors $Tr2$ and $Tr3$ into conduction and transistors $Tr1$ and $Tr4$ are cut-off. The load (T2) is thereby switched across the D.C. supply so that a square wave appears on primary P1 of transformer T2.

Transformer T2 serves two purposes in this circuit. First, it is a matching transformer which matches the lamp and ballast impedance to the inverter. Second, part of the transformer, winding S2, serves as a ballast for the lamps when they are burning.

The operation of transformer T2 has, therefore, two phases. Before the lamps have started to burn, the inverter supplies a square wave to the primary P1. Windings P1, S1 and S2 are in series in an additive connection so that the induced voltage across the three windings, in series, is high enough to start the lamps.

When the lamps start to conduct, the current through winding S2 develops counter flux, and, because of the long magnetic deliberate in the design path between the primary and S2, the flux switches so that the winding S2 is no longer coupled to primary P1. Winding S2 then becomes a series inductance and is so designed to provide the proper impedance to correctly ballast the lamps. The series combination of windings P1 and S1, which are close coupled, provides the burning voltage needed to maintain the arc current in the lamps.

The advantages of the type of inverter described, when used to provide a high frequency power source for fluorescent lamps, are as follows:

(1) A higher voltage can be applied to the inverter than would be possible if a conventional push-pull type inverter were used thereby allowing lower voltage rated transistors to be used.

(2) A lower current, at a higher voltage, is required both from the rectifiers and through the transistors and other components. This fact allows a higher efficiency to be obtained as losses which occur are directly proportional to the resistive elements in the circuit but are proportional to the square of the current $P=I^2R$. Therefore, if the current is halved, and the resistance doubled, the losses are also halved.

(3) The higher voltage, lower current requirement makes the problem of filtering much easier as the power supply impedance is higher, at any specified power requirement, when the voltage is higher.

(4) The efficiency of the output transformer is higher at higher voltages because the step-up ratio required is more nearly unity.

(5) The rectifiers are smaller, lower current units, which can be obtained for less cost.

Figure 2:
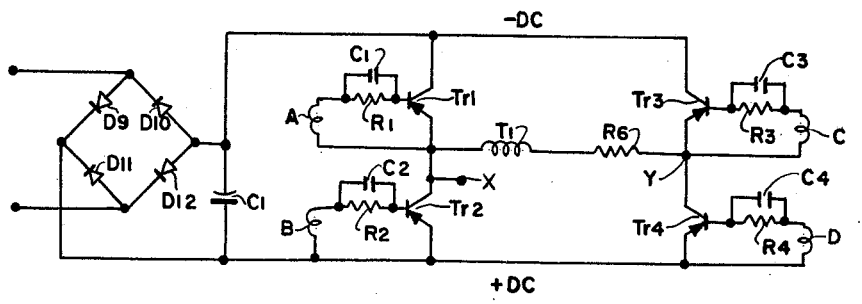
Figure 2A:
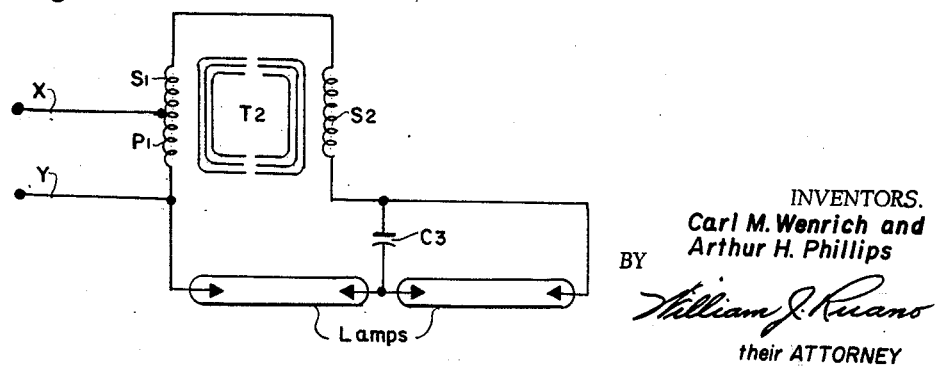

FIG. 2 shows a modification of the inverter and is similar to FIG. 1 except that resistor-capacitor networks $R_1C_1$ and $R_2C_2$ are used to provide the bias in a manner analogous to a grid-leak bias on a vacuum tube. This system has the advantage of providing the correct bias for widely different transistors. This allows a dependable inverter to be manufactured without requiring that the transistors be selected or matched.

Figure 3:
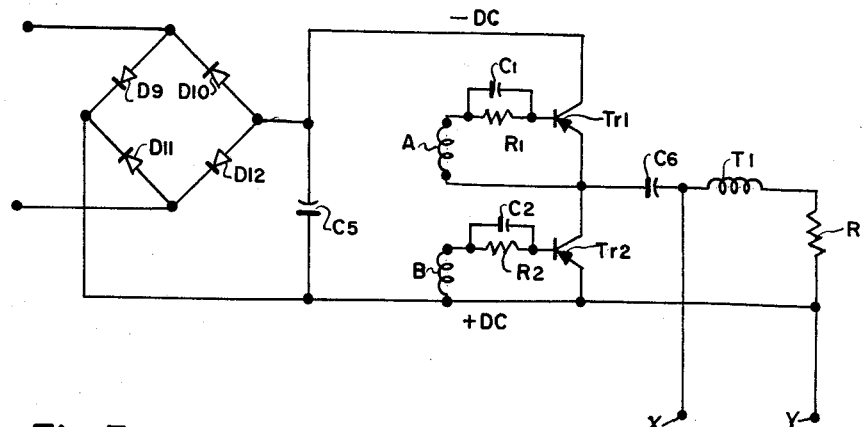
FIG. 3 shows a still further modification of the inverter circuit portion for energizing the lamp circuit portion shown in FIG. 3a; and, FIG. 4 shows an additional modification of the inverter circuit.
Figure 3A:
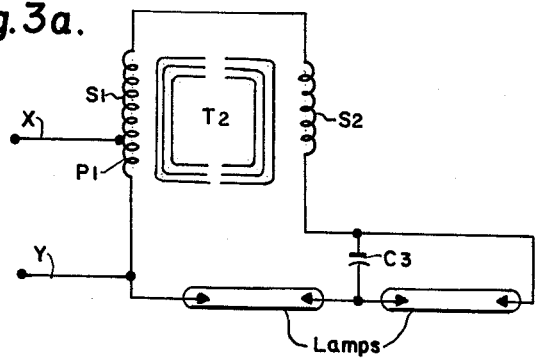

FIG. 3 shows a further modification of an inverter which uses two transistors instead of four. It will not deliver as much power as the inverters shown in FIGS. 1 and 2, assuming that the transistors, rectifiers, etc., are similar in all three instances, but it is less expensive, and simpler, and smaller. All three inverters will produce efficient high frequency power.

The capacitor $C_3$ which shunts one of the lamps allows the inverter to start one lamp at a time and thereby requires that the voltage needed to start the lamps is the burning voltage of one lamp, plus the starting voltage of one lamp instead of twice the starting voltage. The difference is considerable, over 100 volts, and allows the output transformer windings S2 and S1 to be made of heavier wire because fewer turns are needed. This allows a more efficient design to be realized.

Figure 4:
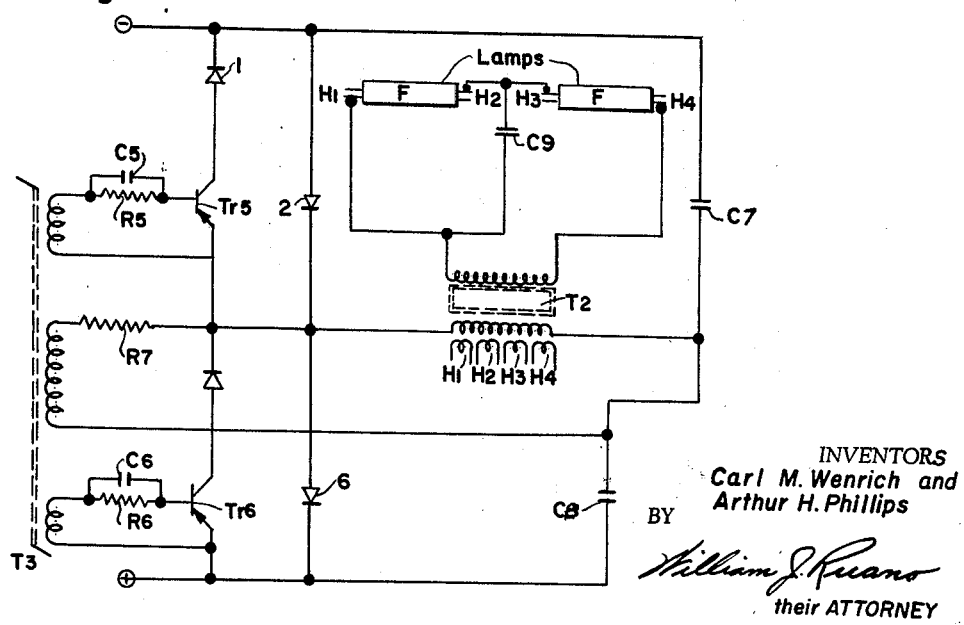

A further modification of the inverter is shown in FIG. 4, which uses a saturable core transformer T3 for controlling the conduction and non-conduction of transistors Tr5 and Tr6. Current in the primary of transformer T3, through resistor R7, causes current to flow in both secondary windings of transformer T3. Because the secondary windings are out-phased (reverse current or voltage), transistor Tr5 will be in a state of conduction, while transistor Tr6 will be in a state of non-conduction. This condition will be sustained until the core of transformer T3 becomes saturated and energy is no longer induced in the secondary windings. At this time, transistor Tr5 is turned to a non-conductive state. During the time transistor Tr5 is conducting, current flows from the two charged capacitors, C7 and C8, through the primary winding of transformer T2, through transistor Tr5, thence through power rectifier 1. When transistor Tr5 becomes non-conductive, the voltage applied to the primary winding of transformer T3 falls, causing a reversal of current. This action causes transistor Tr6 to become conductive and holds transistor Tr5 in a non-conductive state.

The inductive reactance of transformer T2 causes the primary current to be out of phase with the primary voltage. It is for this reason that power rectifiers are used in the circuit.

During parts of the cycle, the out-of-phase current tries to flow backwards (from collector to emitter) through the transistors. It cannot, however, being blocked by rectifiers 1 and 5. Instead, the current is routed back through the rectifiers 2 and 6 to capacitors C7 and C8. This combination of rectifiers and capacitors protects the transistors from reverse currents without disturbing the reactive value of transformer T2. It is this reactance that ballasts the lamp current in lamps F1 and F2.

Leakage reactance between primary and secondary of transformer T2, together with the proper turns ratio, provides starting voltage and operating current.

Windings $H_1$, $H_2$, $H_3$, and $H_4$ on transformer T2 provide cathode heating power for the lamps.

C5–R5 and C6–R6 combinations provide proper biasing to the bases of transistors Tr5 and Tr6. Capacitor C9 aids in starting voltage applied to lamp F2. Lamp F2 receives full starting voltage until it is operating at which time lamp F1 receives full starting voltage minus voltage drop across lamp F2.

In the output transformer T2, a booster winding is not shown, as in the previous figures, since it is not required for operation. The reason for this is that the rectifier elements 1, 2, 5 and 6, used for blocking, prevent the application of reverse potential and currents from flowing back through the transistors, resulting in over-all higher output voltage from the inverter.

The inverter shown in FIG. 4 uses only two transistors and is extremely efficient by reason of the blocking circuits employed. Correspondingly, there are less, or essentially no losses involved in the transistors, resulting in a higher efficiency and quite adequate output. The frequency range of this inverter is not restricted and will provide the advantages described for FIGS. 1, 2 and 3.

Thus it will be seen that we have provided an efficient high frequency ballast system for fluorescent lamps, which system embodies a transformer boosting arrangement which, when the lamps light, produces sufficient counter flux to reduce the voltage to the correct operating level; furthermore, we have provided an improved inverter for operating fluorescent lamps, which inverter can be operated at a higher voltage, and the components of which may be operated at lower currents, therefore enabling use of smaller and less expensive transistors and other components and providing increased efficiency as well as simplification in filtering, greater reliability of operation and longer life with practically no maintenance.

While we have illustrated and described several embodiments of our invention, it will be understood that these are by way of illustration only, and that various changes and modifications may be made within the contemplation of our invention and within the scope of the following claim.

We claim:

A high frequency ballast circuit for fluorescent lamps comprising an inverter having positive and negative terminals energized by a source of direct current, a pair of transistors connected in series across said terminals, each having a serially connected rectifier to allow current to flow from the emitter to the collector of the transistor, a pair of transformers having interconnected primary windings, the first of said transformers having a saturable core and a pair of out of phase secondary windings, each of which is connected to a resistor-capacitor network so as to inductively couple the controlling element of one of said transistors to the primary winding of said first transformer, a pair of rectifiers, each connected between each one of said terminals, respectively, and the primary windings of said first transformer to permit current flow only in the direction from the positive to the negative terminal, a condenser in series with said primary winding of said first transformer forming a shunt circuit bridging each of said last mentioned pair of rectifiers and a pair of fluorescent lamps connected across the secondary of the second transformer, whereby said transistors will be alternately conducting to effect starting of said lamps.

References Cited in the file of this patent

UNITED STATES PATENTS

| | | |
|---|---|---|
| 2,923,856 | Greene et al. | Feb. 2, 1960 |
| 2,977,550 | Roesel et al. | Mar. 28, 1961 |
| 2,997,602 | Eachus | Aug. 22, 1961 |
| 3,018,408 | Genuit | Jan. 23, 1962 |
| 3,038,127 | Wofford | June 5, 1962 |
| 3,059,191 | Hierholzer | Oct. 16, 1962 |